(12) United States Patent
Stryker et al.

(10) Patent No.: US 6,963,939 B2
(45) Date of Patent: Nov. 8, 2005

(54) METHOD AND APPARATUS FOR EXPANSION OF SINGLE CHANNEL AT ATTACHMENT/IDE INTERFACE

(75) Inventors: Chadwick W. Stryker, Albany, OR (US); James P. Dickie, Corvallis, OR (US); Steven L Fogle, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 515 days.

(21) Appl. No.: 10/206,417

(22) Filed: Jul. 26, 2002

(65) Prior Publication Data

US 2002/0188792 A1 Dec. 12, 2002

Related U.S. Application Data

(62) Division of application No. 09/353,330, filed on Jul. 14, 1999, now Pat. No. 6,460,099.

(51) Int. Cl.$^7$ .............................................. G06F 13/00
(52) U.S. Cl. ............................ 710/104; 710/8; 710/10; 710/302
(58) Field of Search ................................ 710/5, 15–19, 710/104, 301, 302; 711/4, 111, 112

(56) References Cited

U.S. PATENT DOCUMENTS

| | | |
|---|---|---|
| 5,041,924 A | 8/1991 | Blackborow et al. |
| 5,239,445 A | 8/1993 | Parks et al. |
| 5,305,180 A | 4/1994 | Mitchell et al. |
| 5,434,752 A | 7/1995 | Huth et al. |
| 5,483,419 A | 1/1996 | Kaczeus, Sr. et al. |
| 5,644,705 A | 7/1997 | Stanley |
| 5,675,761 A | 10/1997 | Paul et al. |
| 5,771,398 A | 6/1998 | Park |
| 5,778,252 A | 7/1998 | Sangveraphunsiri et al. |
| 5,781,798 A | 7/1998 | Beatty et al. |
| 5,805,412 A | 9/1998 | Yanagisawa et al. |
| 5,805,921 A | 9/1998 | Kikinis et al. |
| 5,920,709 A | 7/1999 | Hartung et al. |
| 5,949,979 A * | 9/1999 | Snow et al. ................. 710/302 |
| 6,460,099 B1 * | 10/2002 | Stryker et al. ................. 710/74 |

OTHER PUBLICATIONS

Working Draft of ANSI; Information Technology—At Attachment-3 Interface (ATA-3); X310/2008D; Revision 6, Oct. 26, 1995; Technical Editor, Peter T. McLean; pp 1-180.

* cited by examiner

Primary Examiner—Glenn A. Auve
(74) Attorney, Agent, or Firm—Timothy F. Myers (57) ABSTRACT

An electronic device has a host processor system having an AT Attachment (ATA) mass storage interface having a single channel. The electronic device further has at least three mass storage device ports that are capable of accepting ATA mass storage devices. A method for interfacing the mass storage devices to the ATA single channel interface provides the host processor access to all the ATA mass storage devices.

9 Claims, 8 Drawing Sheets

METHOD AND APPARATUS FOR EXPANSION OF SINGLE CHANNEL AT ATTACHMENT/IDE INTERFACE

This appplication is a division of application Ser. No. 09/353,330, filed Jul. 14, 1999, now U.S. Pat. No. 6,460,099.

FIELD OF THE INVENTION

The invention relates to mass storage interfaces for electronic devices such as computers. More particularly, it relates to expanding the personal computer AT Attachment/IDE interface to support multiple mass storage devices on a single channel.

BACKGROUND OF THE INVENTION

One unrelenting trend in personal computing is the continuing evolution of peripheral devices, in particular, mass storage devices. Mass storage devices such as hard disks, CD-ROMS, DVD-ROMS, ZIP drives, and LS-120 drives, to name a few, are constantly improving. Not only is the amount of storage per unit cost increasing, but also so is the speed at which the personal computer (PC) accesses the media. Consequently, more and more consumers are adding mass storage devices to their personal computers. Unfortunately, some fundamental limitations are preventing these consumers from optimizing their systems.

While high speed mass storage interfaces such as SCSI (Small Computer Systems Interface) exist, the cost of outfitting a computer to have a SCSI interface has keep consumers from widely adopting this standard. While these alternative interfaces for expanding the number of mass storage devices are available for personal computers, they are of limited or no use in notebook computers due to cost, size, power consumption, and cable requirements. Most personal computers are configured with an AT Attachment (ATA) mass storage interface (also known as Integrated Device Electronics (IDE) interface) that is maintained by a standards organization, the American National Standards Institute (ANSI). This ATA standard has allowed the PC to be widely adopted but the standard only provides limited mass storage support especially in the number of drives supported. Because other mass storage standards exist for expanding the number of drives for PC's (such as SCSI), any improvements in the ATA standard interface have dealt mainly with increasing the access speeds of the interface and not with increasing the number of mass storage devices.

Consumers are demanding, however, both the ability to have more ATA mass storage devices in their notebooks and thinner, lighter notebooks. This diametric set of desires is forcing designers and manufacturers to rethink the architecture and layout of notebook computers. In order to satisfy the consumer, a full product line of notebooks and accessories should be available. Notwithstanding, the full product line should share the same peripherals due to competitive cost and time-to-market constraints. Further, several companies have organizations that need several different models of notebooks and there is a strong need to have module interchangeability in order to facilitate keeping stock of spare parts to a minimum.

New notebooks having large displays can incorporate two drive bays in addition to a boot hard disk due to a larger footprint. The thinner notebooks, to keep weight to a minimum, can only support the boot hard disk and possibly one internal drive bay. However, the architecture should provide for external drive bays that can be connected to the thinner notebook. All of the notebook models should support common docking stations and port replicators. Some mass storage devices are accessed only occasionally so the consumers are also requesting that multiple drive bays be available in the docking station to store and preferably access them. The mass storage devices that are used in the docking station need preferably to be usable and interchangeable with mass storage devices in the notebook computer or external drive bay.

Additionally, when replacing modules, the consumer is demanding near foolproof operation. In the past, consumers had to turn off computers before removing accessories. With the advent of 'hot-swap' PC card peripherals that are interchangeable at will, consumers are now expecting that other peripherals such as mass storage devices be hot-swappable. This hot-swap feature is especially valuable when a notebook computer battery is low and a consumer needs to insert an additional battery in the mass storage drive bay to keep the computer running a program. Another time when hot-swapping is valuable is when a program requires a CD-ROM for program data and the user wants to save output from the program on a removable media such as a ZIP or LS-120 drive.

As more and more mass storage devices become available, the desire of the consumer to want to access multiple devices without interchanging them will intensify. New applications such as photo editing will require multiple drives to access both image and program files at the same time. Thus a need exists to be able to support more than 2 ATA mass storage devices either in a single computer or with the use of docking stations or external drive bays, preferably with hot-swap support.

SUMMARY

An electronic device has a host processor system having an AT Attachment (ATA) mass storage interface having a single channel. The electronic device further has at least three mass storage device ports that are capable of accepting ATA mass storage devices. A method for interfacing the mass storage devices to the ATA single channel interface provides the host processor access to all ATA mass storage devices.

DETAILED DESCRIPTION OF THE PREFERRED AND ALTERNATE EMBODIMENTS

Figure 1:
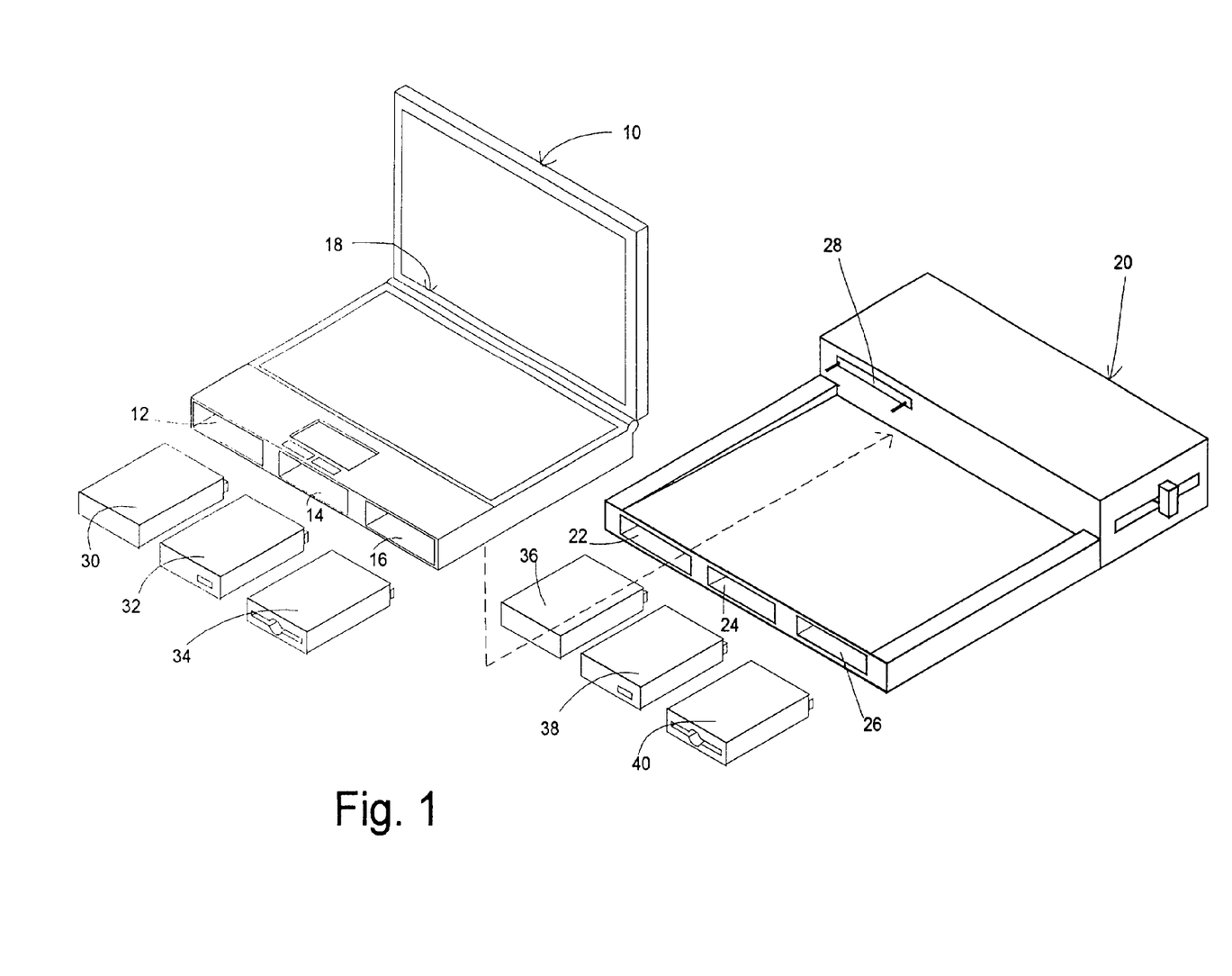
FIG. 1 is an illustration of a notebook computer and a docking station for the notebook computer; each supports multiple mass storage devices.

FIG. 1 is an illustration of an exemplary electronic device such as a notebook computer 10 having multiple mass storage device ports 12, 14, 16 which are capable of accepting exemplary AT Attachment (ATA) mass storage devices such as a boot hard disk 30, a CD-ROM 32, and an LS-120 drive 34. Those skilled in the art also know the ATA mass storage interface as the Integrated Device Electronics (IDE) mass storage interface. While the electronic device incorporating the ATA interface is shown as a notebook computer 10, other electronic devices such as docking stations, personal computers, set-top devices, printers, terminals, and personal data assistants as well as other electronic devices known to those skilled in the art are capable of incorporating aspects of the invention and still meet the spirit and scope of the invention.

The ATA interface is a standard integrated bus interface between mass storage devices and host processors that is defined and maintained by the American National Standard Institute (ANSI). The ATA interface is implemented with an ATA controller having a single channel interface that supports a device 0 (master) and optionally a device 1 (slave) mass storage device. A provision for a secondary channel in IBM compatible personal computers allows a second ATA controller to support another set of device 0 and device 1 devices to allow up to four mass storage devices in a typical IBM compatible personal computer (PC) system. Additional ATA controllers can be added to the PC system to support more drives but these controllers occupy non-standard PC I/O addresses.

Also shown in FIG. 1 is a docking station 20 which has a dock receiving port 28 for interfacing with notebook computer 10 through a docking port 18 (not shown). The docking station 20 has multiple mass storage device ports 22, 24, 26 which can accept exemplary ATA mass storage devices such as an auxiliary hard drive 36, a DVD-ROM 38, and a Zip drive 40. Other ATA type mass storage devices also can be interfaced within either the dock station 20 or notebook 10 and still meet the spirit and scope of the invention.

Typically, notebook and personal computers incorporate a single ATA controller within the system chipset that interfaces to the processor unit. Additional controllers are implemented using plug-in I/O cards for personal computers and docking stations for notebook computers. Because the additional ATA controllers are typically designed by different manufacturers than the system chip set manufacturers, there are differences in the implementations which require modifications to the Basic I/O System (BIOS) code or only minimal BIOS support is provided by the electronic devices, thus limiting the capabilities of the mass storage devices on the ATA mass storage interfaces. Another concern with the ATA mass storage interface is that there is a need to remove and insert devices while the system is powered and operating (known as "hot-swapping"). In order to provide this hot-swap functionality, only one mass storage device is allowed per channel (controller) to prevent possible data corruption on another mass storage device on the channel due to errant signaling when removing or inserting a device on the interface. Therefore, if hot swapping is desired, a separate controller is required for each hot-swap device. Since only two controllers are supported by most operating systems, a notebook having hot-swap capabilities using two controllers could not support additional drives in a docking station without adding a non-standard controller. If drives were supported in the docking station, hot swapping is restricted unless additional circuitry is incorporated in the notebook.

One aspect of the invention is to provide a single channel ATA mass storage interface that is capable of interfacing and accessing greater than two ATA mass storage devices. Another aspect of the invention is to allow for hot swapping of a least one or more of the ATA mass storage devices on a single channel ATA mass storage interface. The ability to interface to greater than two devices on the single ATA channel is accomplished by actively selecting and deselecting the mass storage devices by providing a software driver or subroutine which presents each of the mass storage devices to the operating system as an independent device. This technique allows an operating system to access each of the mass storage devices as independent devices; e.g., the driver performs the necessary interface between the operating system and the mass storage devices and serializes the accesses to all the devices since only one may be accessed at a time. In addition, the driver controls the ATA mass storage devices directly. Thus the driver dynamically enables and disables the ATA mass storage devices as required.

Several different methods for enabling and disabling the mass storage devices have been contemplated. One method takes advantage of ATA mass storage devices that can dynamically respond to the CSEL signal on the ATA interface bus. In this first method, a "zero" or grounded CSEL signal indicates that the drive is a device 0 drive and a "one" or +5 Volt signal indicates that it is a device 1 drive. Drive decode circuitry, controlled by the driver, actively interfaces to the CSEL line. Setting the CSEL line on an ATA mass storage device to a zero activates a drive. For this first method, only one mass storage device on the single ATA mass storage interface is allowed to be active at one time. Setting the respective CSEL line high to make it a device 1 drive inactivates a drive. The driver only accesses a device 0 drive, thus insuring that access to a device 1 drive does not occur. Therefore in this first method, all drives are selectively enabled and accessed as device 0 drives and are disabled when configured as device 1 drives. However, because some drives only sample the CSEL line during reset, the first method may not be acceptable for these types of drives.

A second method is to provide circuitry that intercepts a write to the DRV/HD register so that bit 4 of that register is inverted if the drive is not selected. Bit 4 controls the DRV bit that determines which drive is active. In this second method, all ATA mass storage devices are configured to have the CSEL signal grounded and thus are configured as device 0 drives. Thus to have the driver to deselect a given ATA mass storage device, a 'one' is written to bit 4 of the DRV/HD register and the device will not respond to commands on the ATA interface bus. When a drive is selected, the proper bit 4 signal is sent to the DRV/HD register and that drive has a 'zero' written in bit 4 of the DRV/HD register and the drive then responds to commands.

Both of the above methods require that only one drive be active on the ATA mass storage interface at a time in a manner similar to the master/slave approach of the ATA specification. A third method allows for a mass storage device such as a boot disk drive to remain active as a device 0 drive while simultaneously allowing the driver the ability for the selection and deselection of other device 0 configured drives during accesses using a set of Q-switches, such as Texas Instruments SN74CBTR3384 or equivalent, or other isolation electronics, such as bi-directional buffer integrated circuits.

A fourth and preferred method is to isolate the boot disk drive on a separate channel and to place all other drives as device 0 drives on a second channel. By dedicating the boot drive to a single channel, access to the drive is optimized and allows for greater compatibility with existing software utilities. This fourth method allows the operating system to directly access the boot drive (device 0) and the driver to access all other drives which are configured as device 0 drives on the second channel. The second channel also uses Q-switches or other isolation electronics to selectively enable and disable the device 0 configured drives to be accessed.

By providing for Q-switches or other isolation logic, the desired hot-swapping feature is also implementable. Several different methods can be used to alert the operating system that hot swapping is about to occur. One approach is to have the user provide a special key sequence or select an icon on a display screen. A second and preferred approach is to incorporate the act of the user unlatching a module containing the ATA mass storage device from the system into alerting the operating system that a hot-swap is about to occur. This latch approach is implemented by combining the latch function of the module with a switch that signals the host processor controlling the ATA interface through an interrupt, such as a system management interrupt (SMI) on an Intel Pentium processor. The operating system then alerts the driver to isolate and decouple the hot-swap drive using the Q-switches or other isolation logic.

Another aspect of the invention is to allow a single channel ATA mass storage interface to be used in a docking station when the host processor is a notebook computer or other electronic device. The ATA mass storage interface may be passed preferably through the dock interface 28, or by way of a separate interface.

Another aspect of the invention is that by allowing drives to be selectively coupled and decoupled from the ATA mass storage interface, the driver can configure the ATA mass storage devices to each operate in different timing modes. Thus with the invention, a single channel supports both slow and faster timing mode devices. This feature allows each ATA mass storage device to be operated at its optimum mode thereby increasing system performance.

Figure 2A:
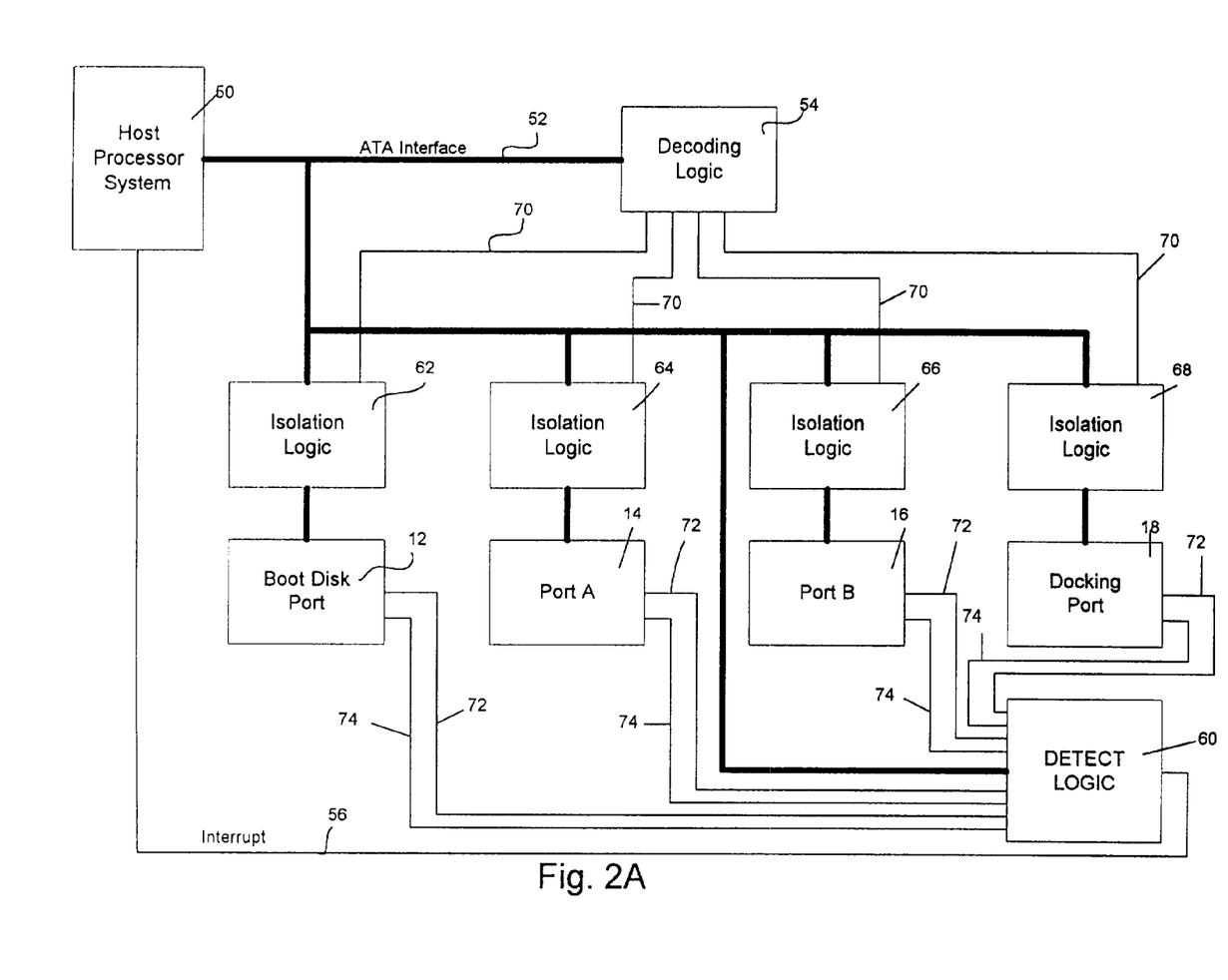
FIG. 2A is an exemplary block diagram of an embodiment for implementing the invention in the notebook computer of FIG. 1.
Figure 2B:
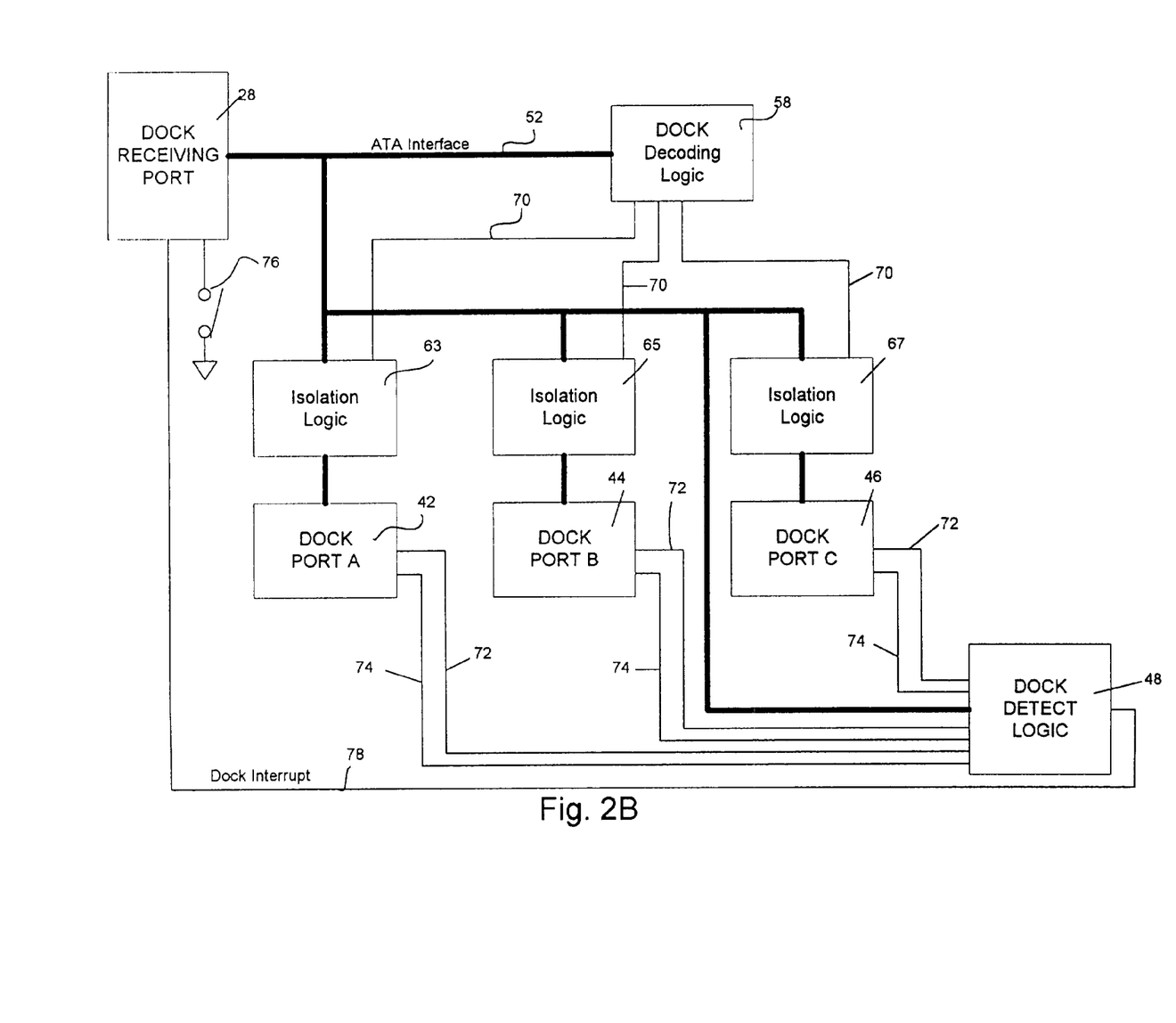
FIG. 2B is an exemplary block diagram of an embodiment for implementing the invention in the docking station for the notebook computer of FIG. 1.

In FIGS. 2A–2B, exemplary block diagrams for the notebook and docking station system of FIG. 1 are shown. FIG. 2A illustrates a host processor system 50 having a single channel ATA interface 52 which is coupled to decoding logic 54 and isolation logic 62, 64, 66, 68 for each supported ATA mass storage port. The decoding logic generates select signals 70 for each supported ATA mass storage port. If all drives are configured as a device 0 (master) drive, then only one select signal 70 is active at a time.

Detect logic 60 is used to generate an interrupt 56 to the host processor system 50. Detect logic 60 also latches the status of the presence of drives in boot disk port 12, port A 14, port B 16, and docking port 18 using detect signals 72, and module remove signals 74. A remove module signal 74 is preferably coupled to a module latch switch on the ATA mass storage device inserted into a port. When the latch switch is activated, the interrupt 56 is signaled to the host processor system 50. The host processor system 50 using the driver subroutine then reads the state of a detect logic latch 98 (see FIG. 6) which is coupled to the detect signals 72 to determine which drive is about to be removed or inserted. In addition, the host processor system 50 driver subroutine can select a drive that is newly inserted to inquire from the drive its device type to optimize the channel timing parameters during subsequent data accesses when accessing the newly inserted drive.

FIG. 2B illustrates an exemplary block diagram for the docking station 20 shown in FIG. 1. The block diagram of the docking station parallels the block diagram for the notebook computer 10. The dock receiving port 28 interfaces to the docking port 18 of FIG. 2A to propagate signals on ATA interface 52 which further couple to dock decoding logic 58 and isolation logic 63, 65, 67 for each of the dock ATA mass storage ports 42, 44, and 46. Each of the dock ports 42, 44, 46 have detect signals 72 and module remove signals 74 which connect to dock detect logic 48. Dock detect logic 48 generates a dock interrupt 78 which is coupled to the detect logic 60 (FIG. 2A) through the dock receiving port 28 and the docking port 18 (FIG. 2A) using detect signal 72 from the docking port 18. An undock switch 76 is coupled to the detect logic 60 also using dock receiving port 28, docking port 18, and module remove signal 74 (FIG. 2A) from docking port 18.

Figure 3:
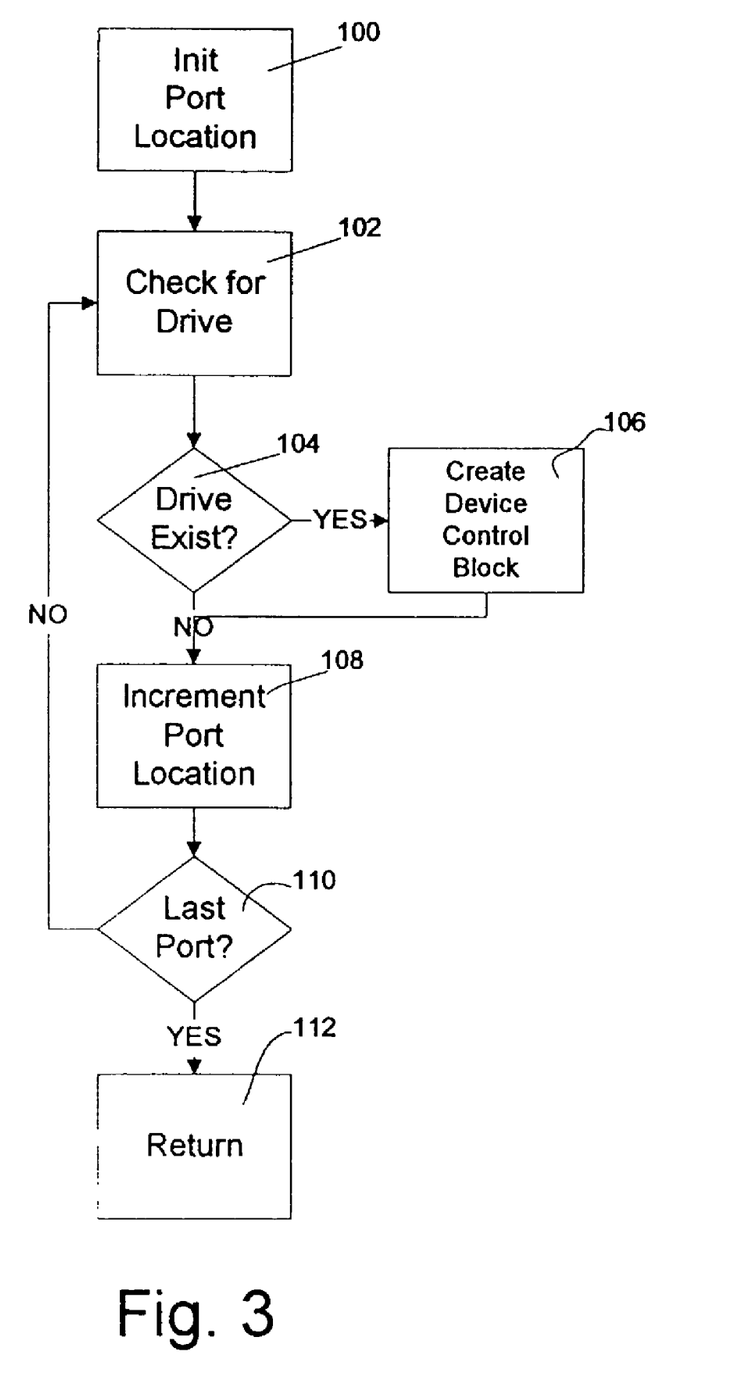
FIG. 3 is a flowchart of a subroutine that determines the number of mass storage devices present and creates a device control block for each mass storage device found.

FIG. 3 is a flow chart of a subroutine of a software driver for an operating system. Both the driver and operating system are loaded and executed in computer readable memory on host processor system 50. For an IBM compatible PC the operating system would preferably be Windows 98 or Windows 95, however, other operating systems such as MS-DOS, OS/2, Linux, Unix, and Windows NT(2000) to name a few are known to those skilled in the art and their use still would meet the spirit and scope of the invention. This subroutine is called when the operating system is being initialized to determine which drives are present in which ports. First in block 100 a starting port location is initialized. In block 102, the port location is selected and checked to see if a mass storage device is present. This action is performed by actively selecting the port location as active and deselecting the other port locations as inactive using the decoding logic 54 (FIG. 2A) and if appropriate dock decoding logic 58. Next, in block 104, the presence of a drive can be determined by checking the detect logic 60 and the dock detect logic 48, as appropriate, or by examining appropriate registers of the ATA mass storage device (see ATA-3 Interface specification, Rev. 6, working draft). If the drive exists in the selected port location, in block 106 a device control block is created in the operating system to allow the operating system to access the drive. If a drive does not exist at the selected port, the port location is incremented in block 108. In block 110, a check is performed to see if there are more port locations that need to be checked and if so, then control is passed back to block 102, otherwise the subroutine returns control back to the operating system in block 112.

Figure 4:
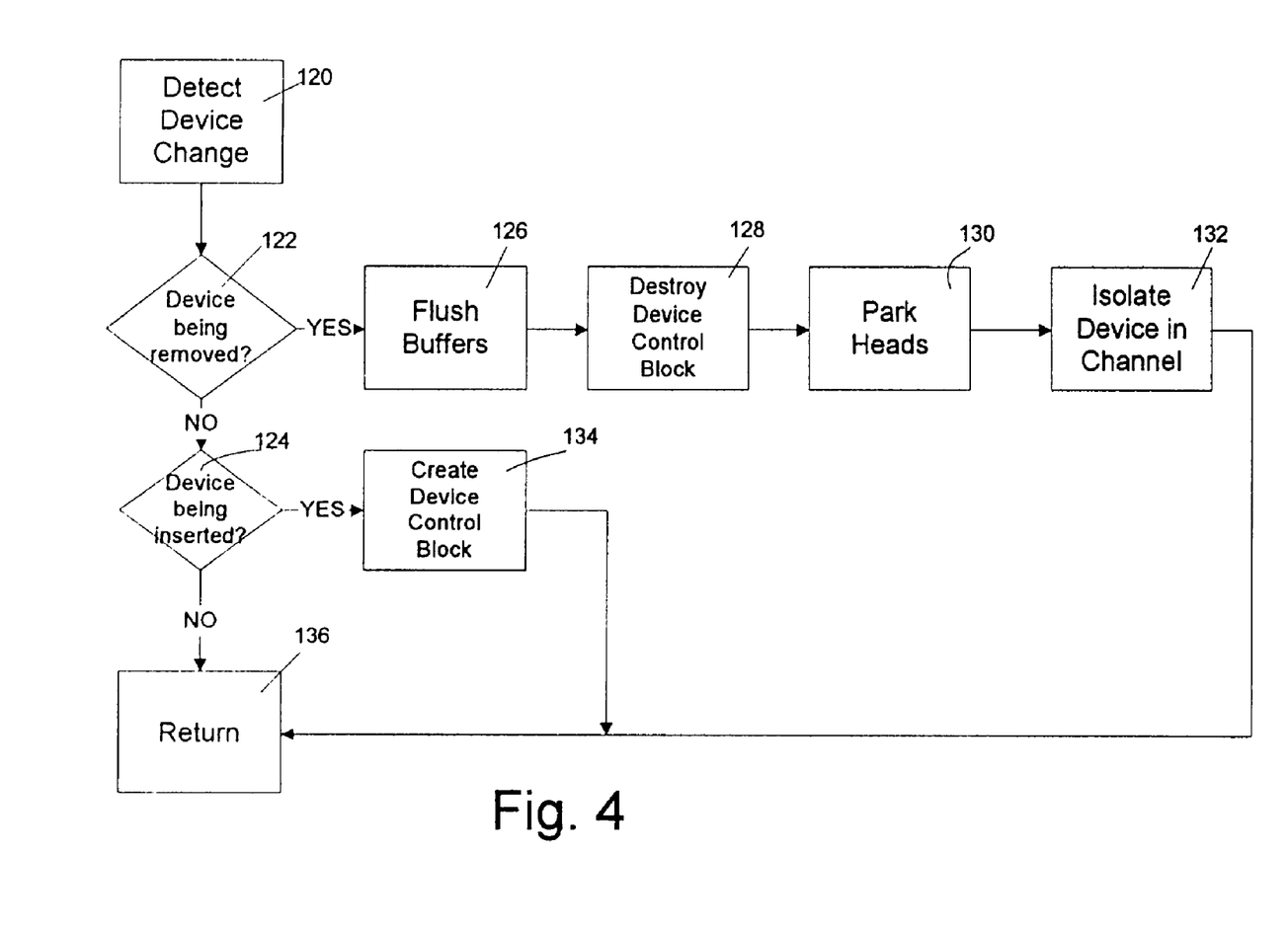
FIG. 4 is a flowchart of a subroutine used to handle hot swapping of mass storage devices.

FIG. 4 illustrates a subroutine the driver uses to support "hot-swapping" of an ATA mass storage device. In block 120, the subroutine is called when a device change is detected by the operating system. A device change is detected by monitoring the interrupt 56 generated by the device detect logic 60 and connected to the host processor system 50. The interrupt 56 is triggered preferably when the module latch switch is activated on a module holding the ATA mass storage device that is to be removed. Another method of detecting that a module removal is about to occur is to allow a user to alert the operating system, such as by clicking on a device removal icon or pressing a special key sequence. In block 122, if the device is to be removed then control is passed to block 126 where any open file handlers and/or buffers are flushed and closed. In block 128, the device control block for the device in the operating system is destroyed to prevent further operating system access requests for the drive. In block 130 the heads of the drive are preferably parked before isolating the drive from other devices in the channel in block 132 and control is returned to the operating system in block 136. If in block 122 a device is not detected as about to be removed, control passes to block 124 where the subroutine checks to see if a new drive is being inserted into a port. If it is determined that a new ATA mass storage device is being inserted into electronic device, such as notebook 10 (FIG. 1) then a new device control block is created for the operating system in block 134. If block 124 determines that a new device is not being inserted, then the subroutine returns to a calling program.

Figure 5A:
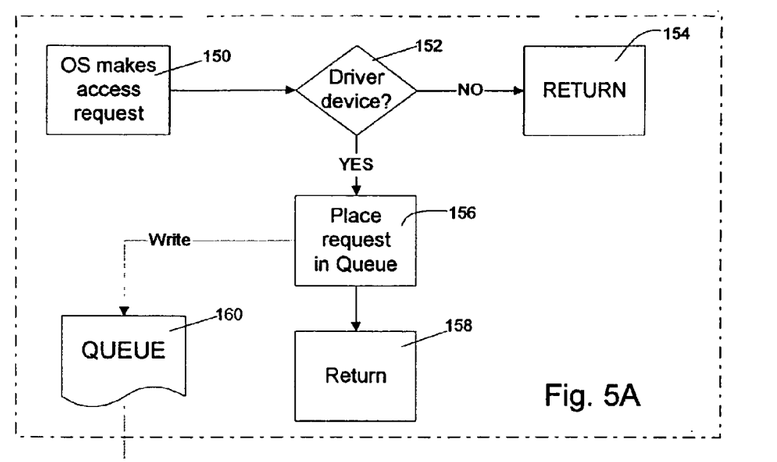
FIG. 5A is a flow chart of a subroutine that receives requests from an operating system to access a mass storage device and places the request in a queue of requests.

FIG. 5A illustrates a block diagram of a subroutine of a driver that is called when the operating system requests access to an ATA mass storage device in block 150. The subroutine does a check in block 152 to see if the subroutine supports the device that is being requested. If not, the subroutine returns control to the operating system in block 154. If the device is supported by the subroutine, block 156 places the request for the device in a queue of requests 160. Control is returned to the operating system in block 158.

Figure 5B:
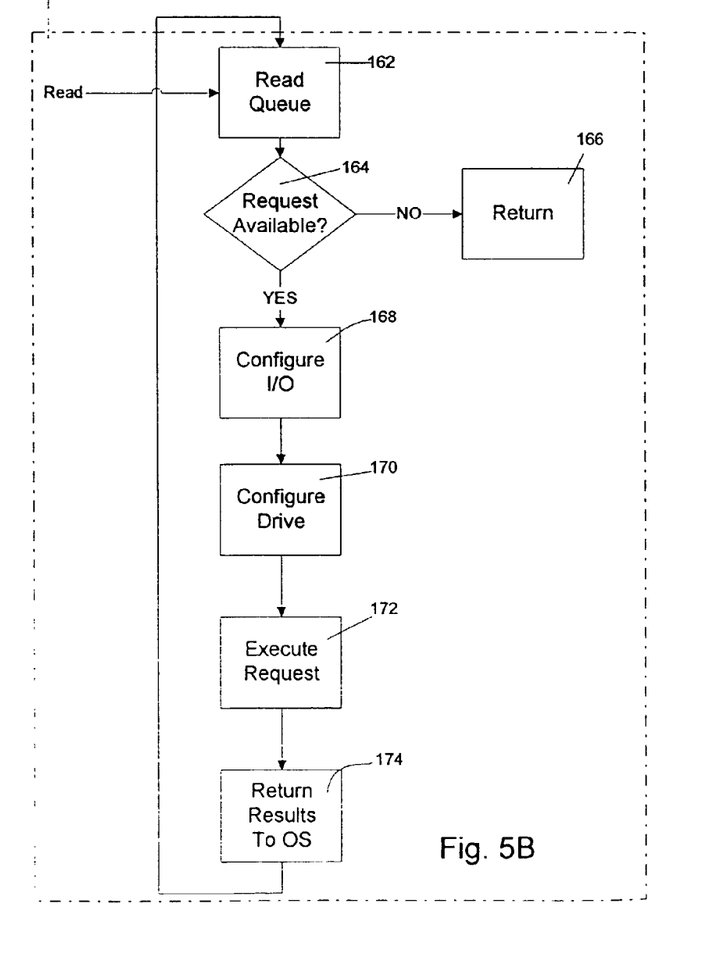
FIG. 5B is a flow chart of a subroutine that reads requests from the queue of requests and executes the request to return the requested result back to an operating system.

FIG. 5B illustrates a block diagram for a subroutine of a driver that is called by an operating system to service requests to ATA mass storage devices. In block 162, the queue 160 is read to retrieve the next pending request. Block 164 checks to see if a request is available and if not then control is returned to the operating system in block 166. If a request is available then block 168 preferably configures the I/O of the ATA interface to match the optimum timing mode for the ATA mass storage device. The ATA mass storage device is coupled to the ATA interface bus and configured as required in block 170 and any other drives are decoupled from the ATA interface bus (unless the option of keeping a device 0 boot disk active is implemented). Once the drive is properly selected and configured, then the access request is executed in block 172. The results of the access request are then returned to the operating system in block 174. Control then passes to block 162 to read the queue 160 to see if other pending requests are present.

Figure 6:
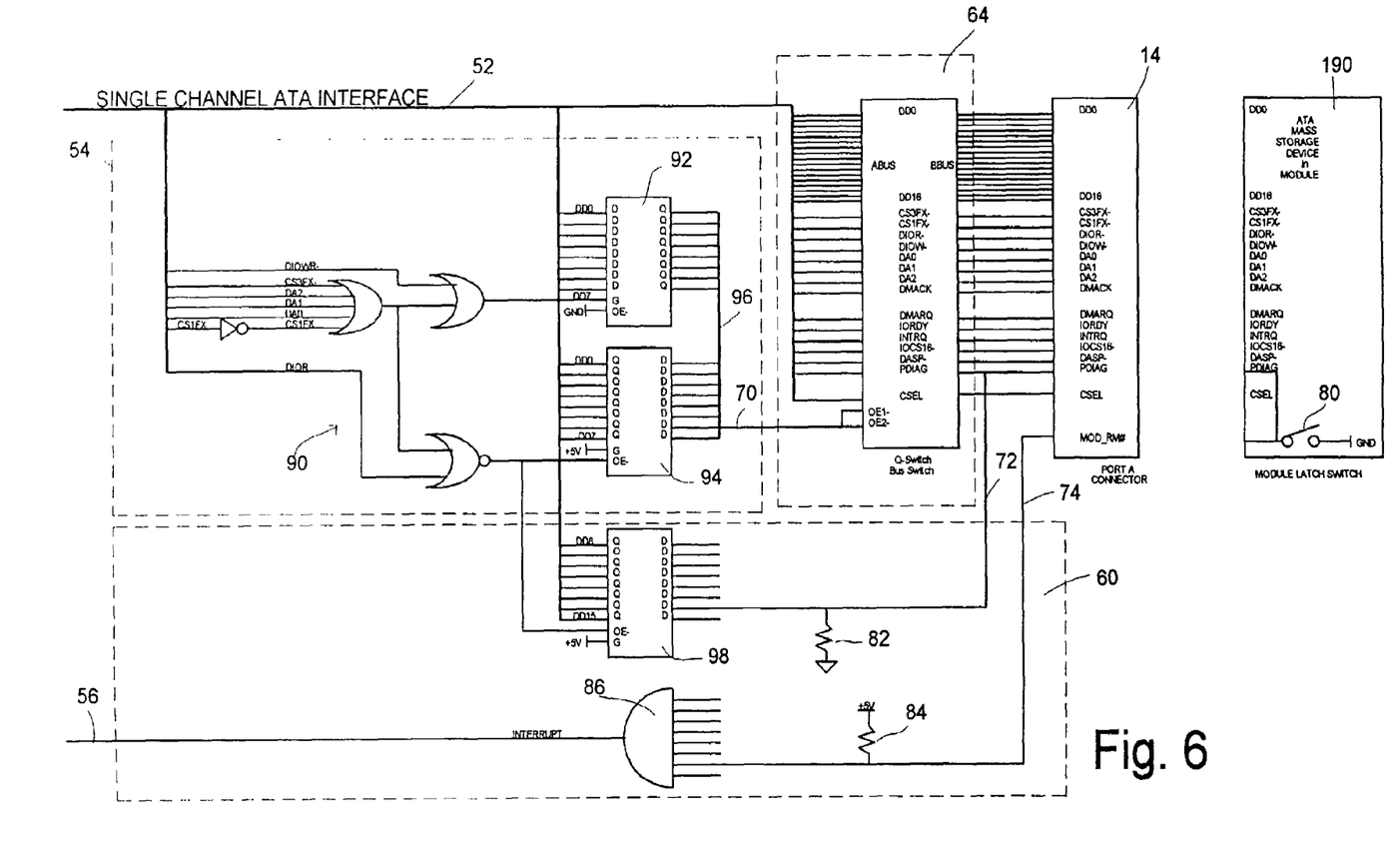
FIG. 6 is an exemplary implementation of the embodiment shown in the block diagram of FIG. 2 for the single mass storage device port, port A of FIG. 1.

FIG. 6 is an exemplary embodiment of a portion of the block diagram shown in FIG. 2A in more detail. The decoding logic 54 block is shown as incorporating an address decoder 90, a write latch 92, and preferably, a read latch 94. Read latch 94 has inputs which are coupled to the outputs of write latch 92 using latch bus 96 to provide for read/write functionality. Write latch 92 is used as a port selection register. Each bit of the port selection register is used to enable and disable one ATA mass storage device in a port, such as shown with select line 70 for port A 14. The address decoding logic in this exemplary embodiment uses an unused address (DA[2:0]=000) in the control block registers of the ATA mass storage device. In this example circuit the lower eight bits of the register are used to select up to eight drive ports. (Seven if one bit is used to control a docking port). The upper 8 bits of the register are used to read status of whether modules are inserted in the ATA mass storage ports using a detect latch 98 in detect logic block 60. One method of detecting that a device is present (such as in block 120 of FIG. 4) in the port is to have a weak pulldown resistor 82 on a detect signal 72 that is connected to the PDIAG signal on the single channel ATA interface 52. A module holding an ATA mass storage device shorts PDIAG with a module remove signal 74, which has a strong pull up resistor 84, when the module 190 is inserted. When the module 190 is inserted, the detect signal 72 is pulled up to alert the host processor system 50 (see FIG. 2A) that the module is present. When the module 190 is removed, the detect signal 72 is pulled low by pulldown resistor 82 thus alerting the host processor system 50 that the module 190 is removed. Module 190 has a module latch switch 80 that closes when a user attempts to unlatch module 190 from the notebook 10. When module latch switch 80 is closed, the module remove signal 74 is pulled low (to GND) along with detect signal 72. AND gate 86 then generates a low going signal that indicates an interrupt 56 to the host processor system 50. Since a user typically holds the module latch switch on the order of hundreds of microseconds or longer, the operating system calls a driver (see FIG. 4) to prepare the drive for removal. The driver then writes to the decoding logic 54 to ensure that the isolation logic 64, shown as Q-switches, decouples the module 190 from the ATA interface bus. The isolation logic 64 is coupled to the ATA mass storage port A 14 connector in this exemplary embodiment and together provide the electro-mechanical interface to module 190. Those skilled in the art will appreciate that several different methods and logic exist to implement the block diagram of FIG. 2A and still meet the spirit and scope of the invention.

Figures 7A, 7B:
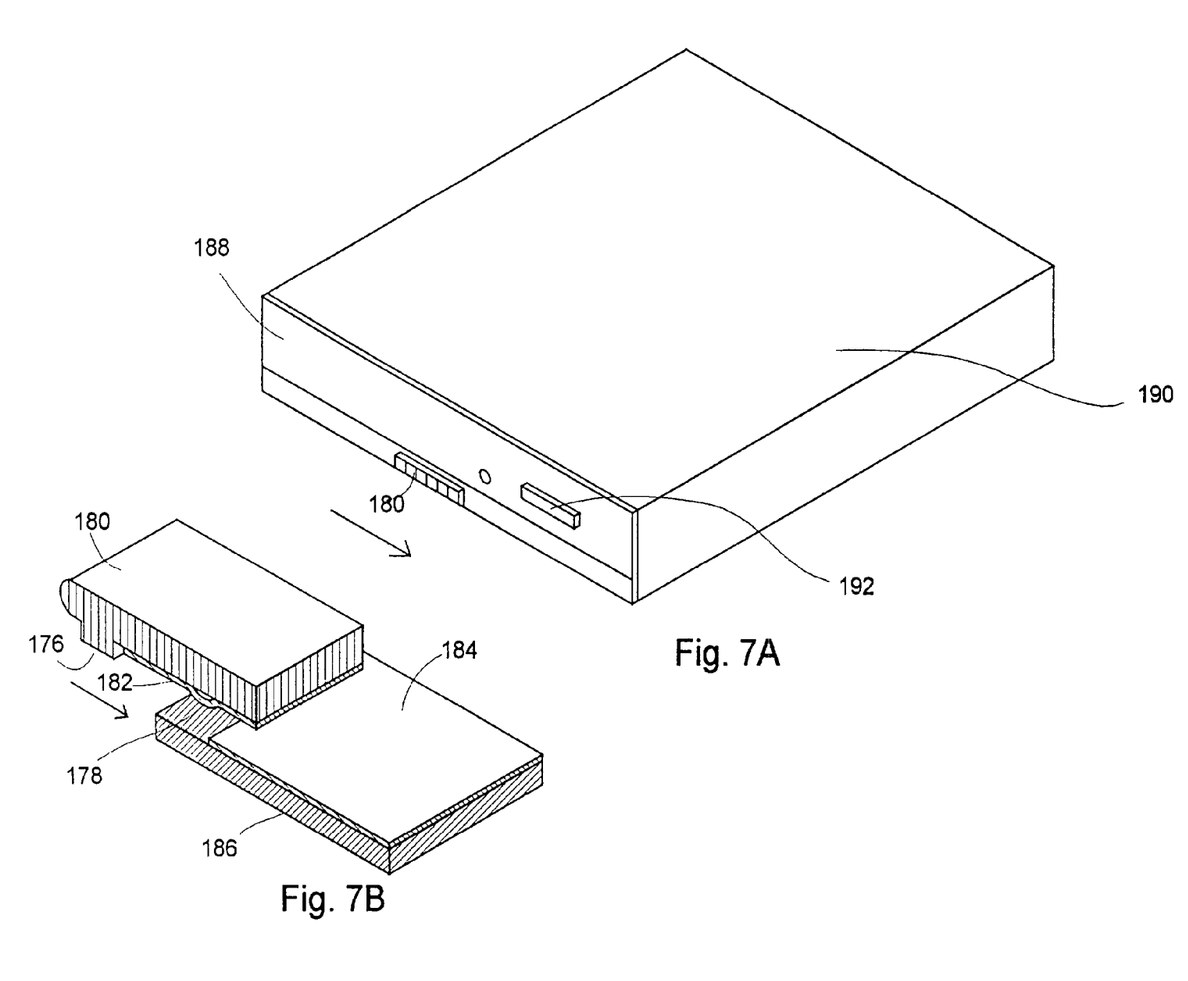
FIG. 7A is an illustration of an exemplary mass storage module having a module latch.
FIG. 7B is a cross-section of the module latch shown in FIG. 7A to illustrate its function.

FIG. 7A is an illustration of an exemplary module 190, such as a CD-ROM, having a module latch 180, front panel 188, and door open button 192. Module latch 180 when moved in the direction of the arrow shown in FIG. 7A unlatches the module from its port and causes the module remove switch to close.

FIG. 7B is a cross-sectional drawing of the module latch 180 of FIG. 7A illustrating how the module latch 180 incorporates the module remove switch 80. Module latch 180 has a metal contact 182 attached to the module latch 180. Contact 182 has a dimple 178 formed within. The metal contact 182 is electrically coupled to the module remove pin on the module connector (not shown). The front panel 188 has a module substrate 186, such as a printed circuit board, that has a conductive ground plane 184 attached to it that is electrically connected to ground (GND). When the module latch 180 is moved in the direction of the arrow shown in FIG. 7B, dimple 178 of metal contact 182 makes contact with the conductive ground plane 184 causing the module remove signal 74 to go low when the module 190 is removed or inserted into port A14. Those skilled in the art will appreciate that other methods and techniques can be used to couple the action of the module latch switch with the module latch and still meet the spirit and scope of the invention.

What is claimed is:

1. A method for providing access to an operating system on an electronic device having greater than two ATA mass storage devices on a single ATA mass storage interface channel, comprising the steps of:
   detecting the presence of a number of ATA mass storage devices greater than two on the single ATA mass storage interface channel;
   creating a device control block in the operating system for each detected ATA mass storage device;
   receiving a request from the operating system to access a stipulated ATA mass storage device on the single ATA mass storage interface channel; and
   isolating all but the stipulated ATA mass storage device on the ATA mass storage interface channel to allow only the stipulated ATA mass storage device to accept commands from the operating system.

2. The method of claim 1, wherein the step of receiving a request from the operating system further comprising the steps of:
  writing the request from the operating system in a queue of pending requests; and
  reading the request from the operating system from the queue of pending requests.

3. The method of claim 1, further comprising the step of:
  configuring the stipulated ATA mass storage device to operate at a desired mode of interface on the single ATA mass storage interface channel.

4. The method of claim 1, further comprising the steps of:
  detecting that an ATA mass storage device is about to be removed from said single ATA mass storage interface channel;
  alerting the operating system that said ATA mass storage device is about to be removed;
  flushing the buffers of said ATA mass storage device;
  destroying the created device control block in the operating system for the ATA mass storage device about to be removed; and
  parking the heads of said ATA mass storage device.

5. The method of claim 4, further comprising the step of:
  isolating the ATA mass storage device from said single ATA mass storage interface channel.

6. The method of claim 4, wherein the ATA mass storage device has a physical latch and wherein the step of detecting that the ATA mass storage device is about to be removed further comprises the step of:
  detecting removal of the ATA mass storage device when the physical latch is activated.

7. The method of claim 4, further comprising the steps of:
  checking if an ATA mass storage device has been re-interfaced to said single ATA mass storage interface channel; and if so,
  creating a device control block in the operating system for the re-interfaced ATA mass storage device.

8. An ATA mass storage interface using the method of claim 1.

9. An electronic device using the method of claim 1.

* * * * *